Nov. 8, 1932.          V. STERNER          1,887,189

FREQUENCY RELAY

Filed Dec. 21, 1927

VALDEMAR STERNER
INVENTOR
BY

ATTORNEY.

Patented Nov. 8, 1932

1,887,189

UNITED STATES PATENT OFFICE

VALDEMAR STERNER, OF VASTERAS, SWEDEN, ASSIGNOR TO ALLMANNA SVENSKA ELEKTRISKA AKTIEBOLAGET, OF VASTERAS, SWEDEN, A CORPORATION OF SWEDEN

FREQUENCY RELAY

Application filed December 21, 1927, Serial No. 241,578, and in Sweden April 1, 1927.

The present invention relates to a relay giving an indication in one sense or in the other, as soon as the frequency of the voltage or current actuating the relay rises above or falls below a certain value.

Figure 1:
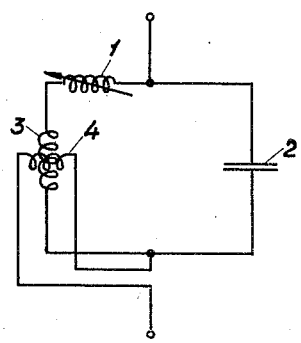
Figure 2:
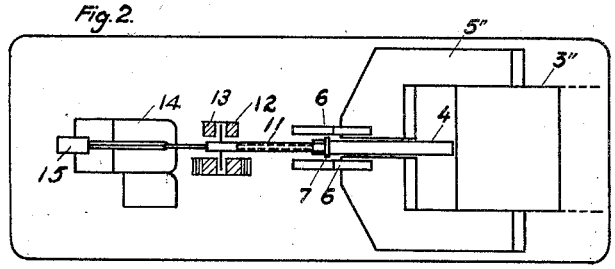
Figure 3:
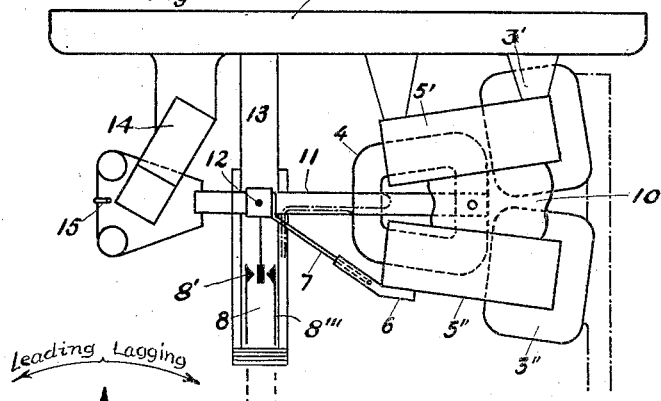
Figure 3:

A form of the invention is illustrated in the accompanying drawing where Fig. 1 shows a diagram of connections of the relay, Figs. 2 and 3 show the mechanical construction of its movable parts in two views perpendicular to one another, and Fig. 4 is a vector diagram.

Referring to Fig. 1, 1 is an inductance coil, preferably variable, and 2 a condenser. A voltage winding 3 of the relay is in series with the former. The total inductance of the inductance coil and the series winding is in resonance with the capacity of the condenser for a certain frequency. A current winding 4 movable with respect to the voltage winding is connected in series with the resonance circuit.

When the frequency has the value for which the resonance circuit has been tuned, the resultant current through the said circuit is zero, with the exception of a small residual current which is in phase with the voltage impressed on the circuit. If the condenser, the voltage winding 3 and the inductance coil 1 are assumed to have no losses, the said residual current will be zero, and the current in the winding 3 will be displaced by 90° with respect to the aforesaid voltage, and under these conditions no torque would be produced between the two windings, even by a residual current in the winding 4 in phase with the voltage. If the frequency falls below the said value, the current through the inductances will be preponderant, and the winding 4 will carry a current in phase with that in the coil 3. If, on the other hand, the frequency rises above the aforesaid value, the current through the condenser becomes preponderant, and a current will flow through the winding 4 in opposite phase to that just referred to. The relay will thus make an indication in either of two opposite directions. A complete reversal of the current in coil 4 would take place only in the theoretical case of no losses in the circuits. In reality, only the component of said current in phase with the flux of current in 3 is reversed.

The circumstance of the inductance coil 1 and the voltage winding 3 not being entirely free from losses has only the influence that the force exerted by the relay becomes zero for a frequency slightly higher than the resonance frequency. This will be evident from the following explanation.

In the diagram shown at Fig. 4, neither the inductances nor the capacity has been assumed to be without losses, so that the diagram will represent the general case. In this diagram E represents the voltage impressed upon the circuit containing the condenser 2 and inductances 1 and 3. In the condenser, this voltage produces a current $I_2$ which leads the voltage by approximately 90°. In the inductive branch including the inductance 1 and relay coil 3, a current $I_3$ flows which lags behind the voltage also by approximately 90°. If the magnetic circuit contains iron, as assumed for the examples shown in Figs. 2 and 3, the flux $\phi_3$ created by the current $I_3$ lags a little behind $I_3$. If there were no iron, these vectors would be exactly in phase.

The resultant current $I_4$ of currents $I_2$ and $I_3$ flows through the coil 4. An increase of frequency by say 10% will increase $I_2$ by practically this amount and decrease $I_3$ by nearly the same amount, while both currents $I_2$ and $I_3$ change their phase angles only very slightly. The phase angle of $I_4$, on the contrary, will be very substantially altered. A decrease of frequency will change the conditions in the opposite direction. It is easily found, that there is always a certain frequency for which the current $I_4$ is in quarter-phase with the flux $\phi_3$ and thus causes no mutual torque between the coils 3 and 4. The more the ohmic and magnetic losses are reduced, the more the parallellogram of current vectors in the diagram is flattened, and the more the condition of no torque will correspond to equal values of $I_2$ and $I_3$ (resonance). By making the inductance of coil 1 variable, the frequency giving no torque can at any rate be regulated to the desired value.

In the example of arrangement of the relay as shown in Figs. 2 and 3, the relay has two magnetic cores 5', 5'', one of which 5'' is directly supported by projections on a base plate 9, while the other 5' is held by intermediary pieces 10 secured to the core 5''. The voltage winding designated by 3 in Fig. 1, is divided into two coils 3', 3'', one on each of the cores 5', 5''. The current coil 4 is supported on an arm 11 swinging on pivots 12 in pedestals 13 mounted on the base plate 9. The said coil 4 is flat in shape and movable in air gap in the two cores 5', 5'', the flux of each of said cores acting on a particular portion of the coil 4 and being so directed that the forces exerted will produce a torque in the same direction on the arm 11. The said arm carries a movable contact 8 adapted to make contact with either of two contacts 8', 8'' supported by one of the pedestals 13 in an insulated manner.

In order to stabilize the relay, there should be some force counteracting that acting on the coil 4. In the example shown, this force is derived from the electromagnet 3'', 5'', the core 5'' carrying two projections 6 which embrace an air gap in which a small armature 7 of soft iron moves. Said armature is secured to the arm 11, and when centrally confined between the two projections 6 it is subjected to no force, but as soon as rotated from this position it is subjected to a force tending to bring it back again. The method of deriving this force from the electromagnet 3'', 5'' has the advantage that if the voltage impressed upon the relay varies, the said force will vary in the same sense. There may be added thereto a counter-force derived in an analogous manner from a permanent magnet 14 secured to the base plate 9 and acting on a small armature 15 secured to an extension of the arm 11. This force is thus independent of the voltage.

I claim as my invention:—

1. A frequency relay comprising a voltage coil wound on a stationary iron core having an air gap, a capacity connected in parallel with said voltage coil, and a current coil movable in the air gap of said iron core and traversed by the resultant current passing through said voltage coil and capacity.

2. A frequency relay comprising a voltage coil wound on a stationary iron core having an air gap, a variable inductance coil connected in series with said voltage coil, a capacity connected in parallel with said voltage coil and induction coil, and a current coil movable in the air gap of said iron core and traversed by the resultant current passing through said coils and capacity.

3. A frequency relay comprising an inductance coil and a capacity in parallel, a winding traversed by the resultant current passing through said inductance and capacity, a winding subjected to a voltage proportional to that acting on said inductance and capacity, one of said two windings being movable with respect to the other, and magnetic means counteracting the said motion, said magnetic means varying in strength with the voltage.

In testimony whereof I have signed my name to this specification.

VALDEMAR STERNER.